United States Patent [19]

Coleman et al.

[11] 4,136,508

[45] Jan. 30, 1979

[54] CLOSED-LOOP COMBINE HEADER HEIGHT CONTROL

[75] Inventors: Martin W. Coleman, Independence, Mo.; Edwin M. Northup, Milwaukee, Wis.

[73] Assignee: Allis-Chalmers Corporation, Milwaukee, Wis.

[21] Appl. No.: 758,064

[22] Filed: Jan. 7, 1977

[51] Int. Cl.² ............................................. A01D 75/28
[52] U.S. Cl. ..................................... 56/208; 56/10.2; 56/DIG. 15
[58] Field of Search ....................... 56/10.2, 10.4, 208, 56/DIG. 15

[56] References Cited

U.S. PATENT DOCUMENTS

| | | | |
|---|---|---|---|
| 3,623,301 | 11/1971 | Hofier | 56/208 |
| 3,722,193 | 3/1973 | Strubbe | 56/208 |
| 3,789,939 | 2/1974 | Geislinger | 56/DIG. 15 |
| 3,805,798 | 4/1974 | Girodat | 56/10.2 |
| 3,851,451 | 12/1974 | Agness et al. | 56/208 |
| 3,886,718 | 6/1975 | Talbot | 56/208 |
| 3,889,249 | 6/1975 | Bennett, Jr. et al. | 56/10.2 |
| 3,906,710 | 9/1975 | Pask | 56/208 |
| 3,908,345 | 9/1975 | Oni et al. | 56/208 |
| 3,991,618 | 11/1976 | Stampter et al. | 56/DIG. 15 |
| 4,004,289 | 1/1977 | Kirk | 56/DIG. 15 |

Primary Examiner—Russell R. Kinsey
Assistant Examiner—Paul J. Hirsch
Attorney, Agent, or Firm—Lee H. Kaiser

[57] ABSTRACT

A closed-loop height control for the header of a combine harvester permits adjustment of height setpoint and deadband from the operator's platform without stopping the combine. A variable capacitance is rotated in accordance with minimum clearance between header and ground to generate a continuous electrical header height signal which is compared to a setpoint signal indicative of desired header height to derive a height error signal whose value is at a null level when actual header height is equal to desired height indicated by the setpoint signal and which deviates in both magnitude and direction from the null level as a function of the variation between actual header height and setpoint height. Raise and lower command signals are derived in response to a predetermined deviation of the height error signal in opposite directions respectively from the null level by first and second Schmitt trigger circuits having switching levels which respectively are greater than and less than the null value. A logic circuit controls transmittal of the raise and lower command signals to electrohydraulic power means for raising and lowering the header, and the operator need only actuate a single raise-lower switch at the operator's platform to select whether the logic circuit is in an automatic mode in which the command signals are transmitted or a standby mode in which they are blocked from the power means.

36 Claims, 8 Drawing Figures

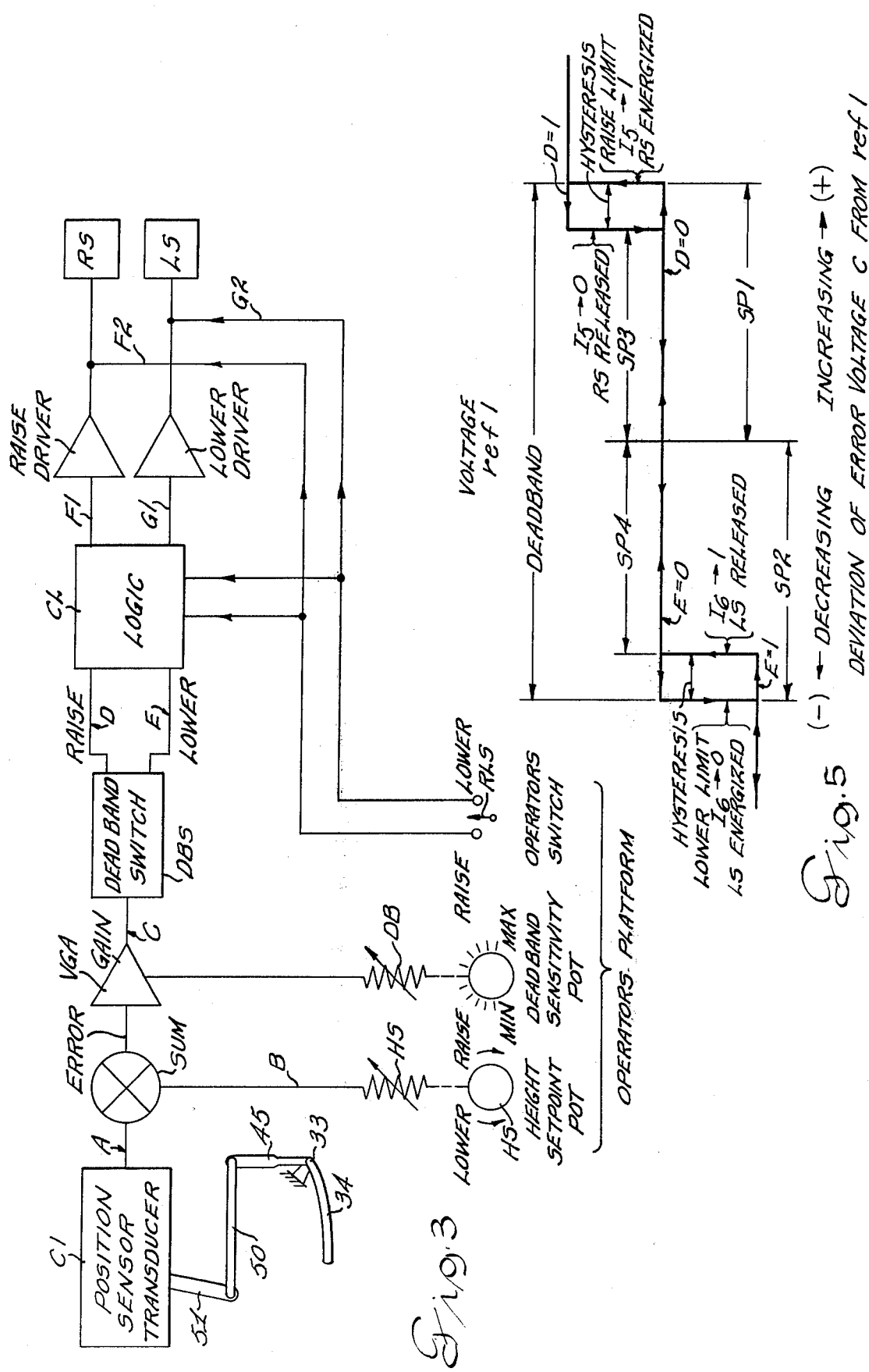

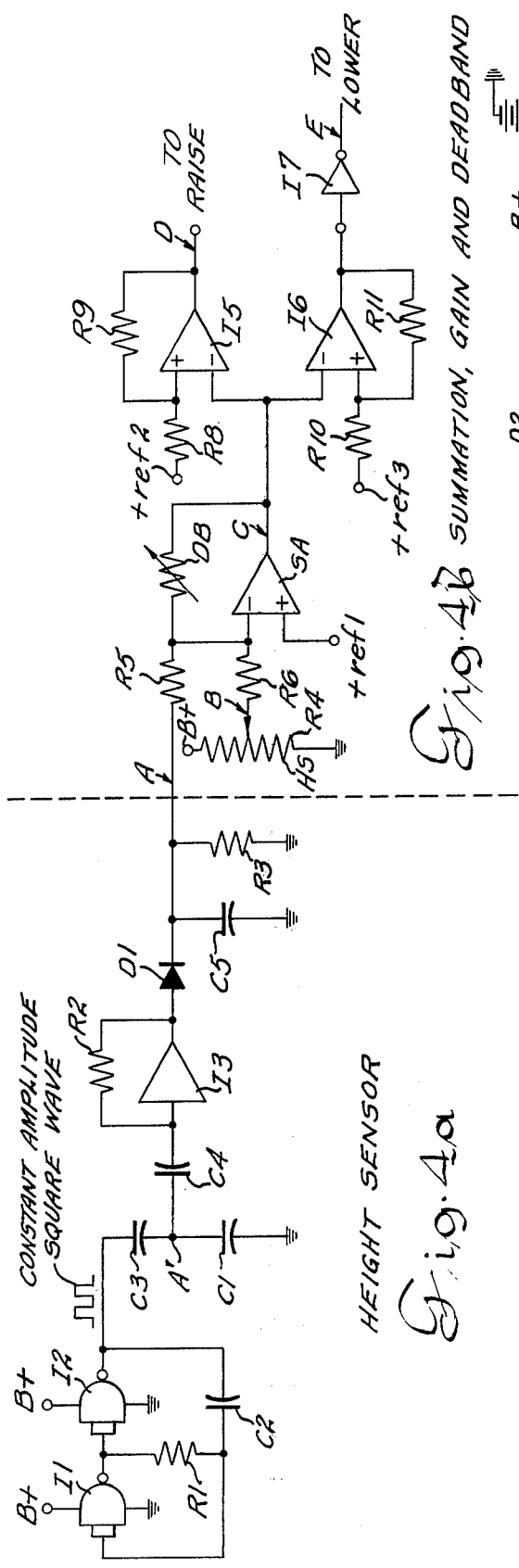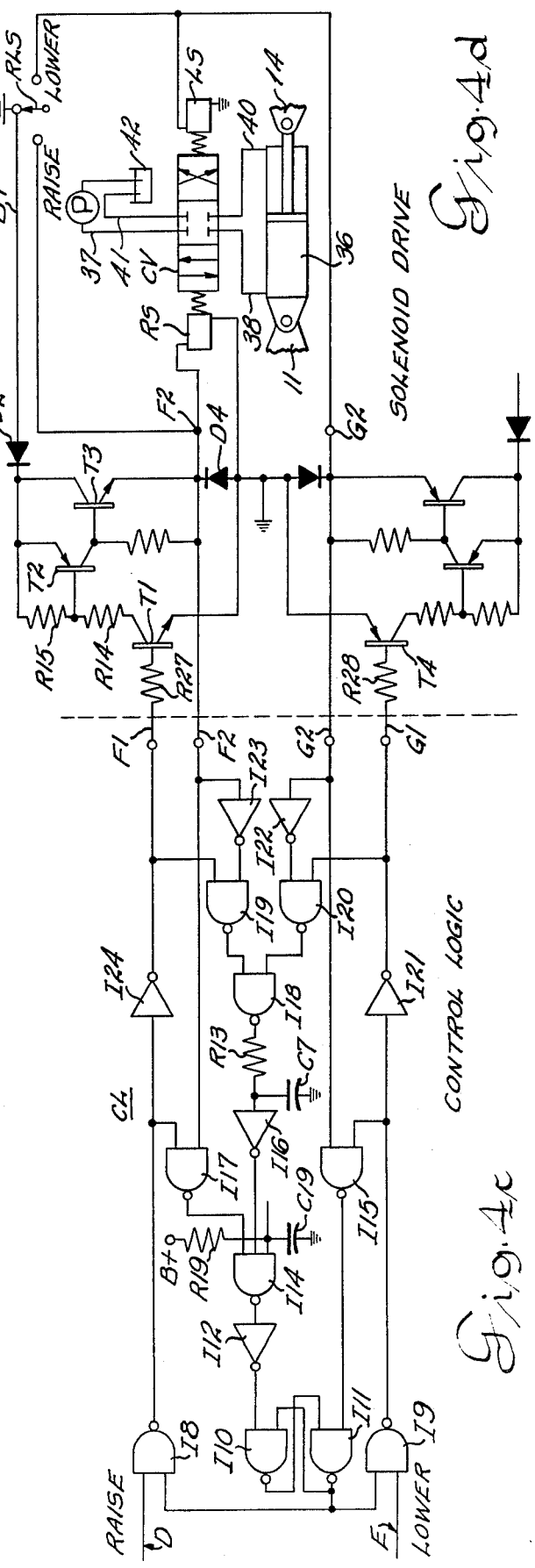

CLOSED-LOOP COMBINE HEADER HEIGHT CONTROL

This invention relates to harvesters having a vertically adjustable crop-gathering header and more particularly to harvester combines having an automatic control for regulating the height of the header.

BACKGROUND OF THE INVENTION

The crop-gathering header of a harvester combine travels as close to the surface of the ground as possible in order to gather and harvest low-lying feed crops such as soybeans, and consequently the cutting mechanism carried by the header frequently encounters surface rises and depressions in the contour of the terrain which cause the header to bounce and occasionally dig the crop-cutting mechanism into the ground. The header should be maintained at a minimum position above the ground in order to avoid picking up stones and running the cutting mechanism into the ground, but in most self-propelled combines the operator's platform is in a cab above the crop-gathering header from where it is difficult for the operator to tell how high the header is above the ground. In order to relieve the operator of this task, header height controls are known for the purpose of detecting ground contour variations and signaling them to hydraulically or electrically operated power devices which then adjust the height of the header above the ground, sufficiently in advance of the adverse position, so as to prevent the cutting mechanism from digging into the ground. Although known header height controls have height setpoint adjusting means for selectively setting the header to a predetermined height above the ground, such known header height controls require that the operator stop the combine and climb down from the operator's platform in order to change the header height setting.

Known header height controls have a "deadband" within which the control is disabled when header height is between the raise and lower deadband limits at which the height sensors actuate the electrohydraulic power means to respectively raise and lower the header, and some controls also have means to vary the width of such deadband. However, known header height controls require that the operator stop the combine and climb down from the cab in order to vary the deadband. Further, it is difficult to adjust both deadband and height to obtain optimum settings in known header height controls.

For example, in one prior art header height control a four-bar mechanical linkage including a turnbuckle actuates a rotatable cam which operates raise and lower limit switches that derive electrical command signals for raise and lower solenoids. The header height setpoint represents the midpoint in the travel of the rotatable cam between the raise deadband limit at which the cam operates the raise limit switch and the lower deadband limit at which it operates the lower limit switch, and header height setpoint is adjusted by the operator getting out of the cab and changing the length of the turnbuckle in the four-bar mechanical linkage and similarly deadband is adjusted by changing the hole in a radial link of the four-bar linkage in which the turnbuckle is engaged.

Prior art header height controls have hysteresis at the raise deadband limit between the operate point and the release point for the raise power means and also have hysteresis at the lower deadband limit between the operate point and the release point for the lower power means, but the amount of hysteresis is known header height controls is not fixed but rather varies with both the height setpoint adjustment and with the deadband adjustment.

Known header height controls have both an automatic mode of operation and a manual mode which overrides the automatic mode, but known controls are unnecessarily complex in that they require a manual-automatic switch for placing the control in the manual mode and for restoring it to the automatic mode, as well as separate switches for raising and lowering the header when the control is in the manual mode. Such known header height controls require that the combine operator manipulate both the manual-automatic switch and the raise switch at the end of each crop row when he wants to lock out automatic operation so that the header will remain up, and also require that the operator manipulate the manual-automatic switch at the beginning of the succeeding crop row when he wants to restore the control to the automatic mode. Further, known electrical header height controls are sensitive to contamination and subject to faulty operation in utilizing electrical switches with separable contacts to initiate the raise and the lower power operations, and such separable switch contacts may undesirably be held open by particles of dust or dirt.

OBJECTS OF THE INVENTION

It is an object of the invention to provide an automatic header height control for the crop-gathering header of a combine which permits the operator to change the reference setpoint, or desired height setting, from the operator's platform without stopping the combine.

It is a further object of the invention to provide an automatic header height control system for the crop-gathering unit of a combine which permits the operator to adjust the deadband from the operator's platform and to do so without stopping the combine.

Another object of the invention is to provide an automatic control for the crop-gathering header of a combine which derives an electrical signal that continuously varies as a function of the height of the header above the ground and transmits such signal to adjustment means accessible at the operator's platform where such signal can be modified as desired before being utilized to control the power means which raise and lower the header.

A still further object is to provide such an automatic header height control of the electrical type which is insensitive to contamination by dust and dirt.

Still another object is to provide such an improved header height control wherein the hysteresis band is fixed and is independent of the height setpoint adjustment and is also independent of the deadband adjustment.

Another object is to simplify operation of the control and reduce, in comparison to prior art apparatus, the number of switches which the combine operator is required to manipulate in order to accomplish optimum performance of the control.

Another object is to provide an improved header height control wherein the combined operator need only manipulate a single raise-lower switch at the operator's platform to set the control in the automatic mode at the beginning of each crop row and to also lock out automatic operation and restore it to the manual mode at the end of the row.

SUMMARY OF THE INVENTION

A crop harvester embodying the closed-loop header height control of the invention has header position sensor means including a sealed, rotary variable impedance transducer for deriving an electrical header height signal which continuously is an analog of minimum clearance between header and ground; setpoint adjusting means accessible at the operator's platform for deriving an electrical reference setpoint signal proportional to desired header height; means for comparing the header height and setpoint signals to derive a height error signal whose value is at a null level when actual header height is equal to the desired header height indicated by the setpoint signal and varies in both direction and magnitude from the null level as a function of the variation between actual header height and setpoint height; means for deriving electrical raise and lower command signals in response to a predetermined deviation of the error signal in opposite directions respectively from the null value; deadband adjusting means accessible at the operator's platform for selectively varying the sensitivity of the height error signal deriving means; and electrohydraulic power means for raising and lowering the header in response to the raise and lower command signals respectively.

In a preferred embodiment, the difference between the header height and setpoint signals is compared to a reference voltage in a summing amplifier whose output is the height error signal and is at the null level and equal to the reference voltage when actual header height is equal to setpoint height and which varies in opposite directions respectively from the reference voltage as a function of the variation between said difference and the reference voltage. The deadband adjusting means preferably comprises a feedback potentiometer for the summing amplifier, and the raise and lower command signals are derived by first and second Schmitt trigger circuits comprising comparator operational amplifiers which receive the error signal as an input and whose switching levels are respectively above and below the reference voltage. The output voltages from the comparators are fed back to change their triggering levels when they switch between low and high to thereby provide fixed hysteresis between generation and extinction of the command signals.

A control logic circuit has an automatic mode wherein it transmits the command signals to the electrohydraulic power means and a standby mode wherein it does not respond to the command signals and automatic operation is locked out, and the control logic circuit is set to the standby mode by operation of a single raise-lower switch to "raise" so the header will remain up at the end of a crop row and is restored to the automatic mode by operation of the switch to "lower" so the header will automatically return to the setpoint height at the beginning of a crop row.

DESCRIPTION OF THE DRAWINGS

These and other objects and advantages of the invention will be more readily apparent from the following detailed description when considered in conjunction with the accompanying drawings wherein:

FIG. 3 is a block diagram of a preferred embodiment of the invention;

FIG. 4 is a schematic circuit diagram of a preferred embodiment of the invention with FIG. 4a illustrating the header height sensing means; FIG. 4b the summation, gain adjusting and deadband setting means; FIG. 4c the control logic; and FIG. 4d the solenoid driver and the electrohydraulic means for raising and lowering the header; and FIG. 5 is a diagrammatic illustration of deadband in the disclosed embodiment of the invention.

DETAILED DESCRIPTION

Figure 1:
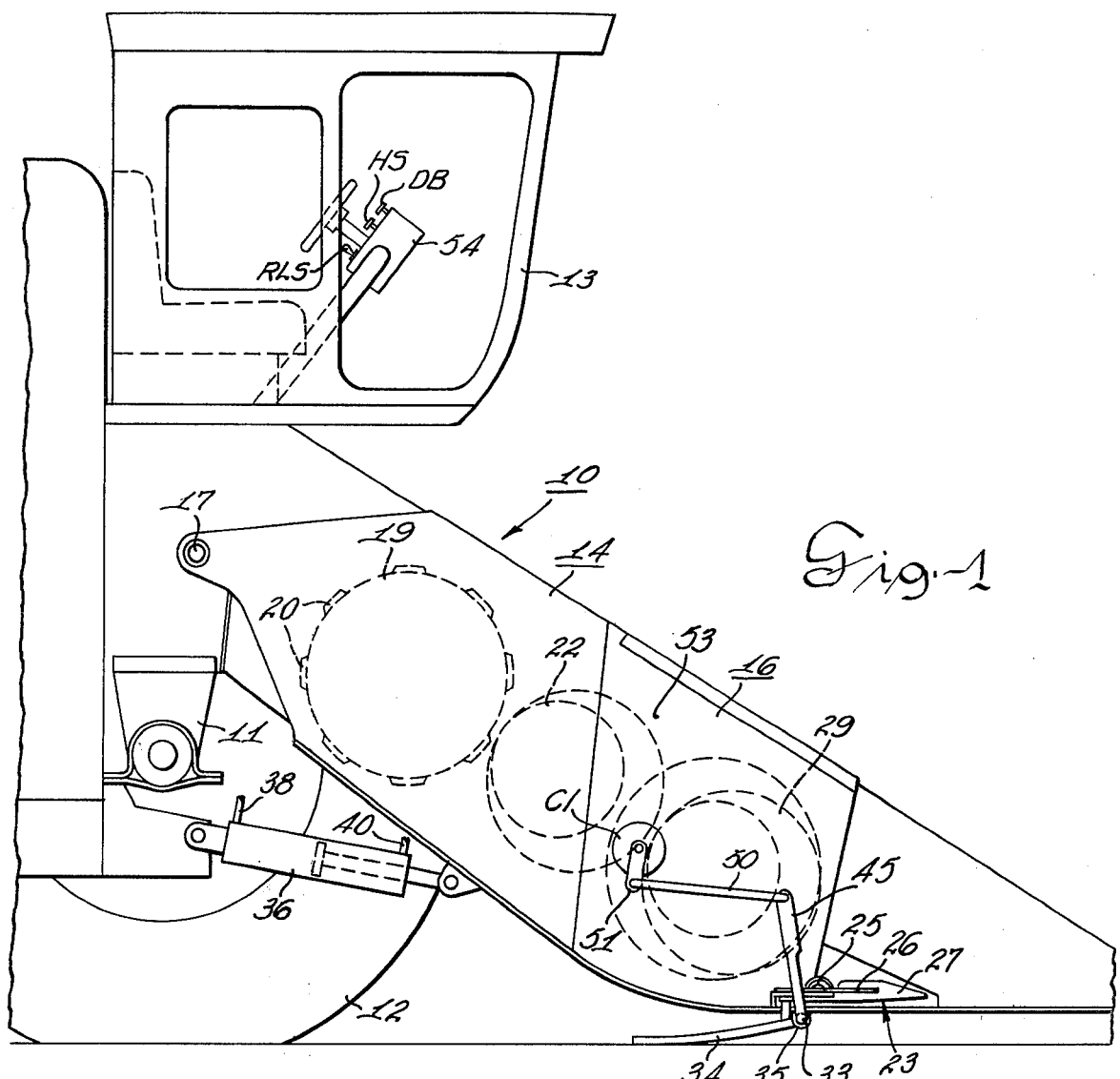
FIG. 1 is a fragmentary front view of a combine harvester incorporating a preferred embodiment of header height control of the invention.

Referring to the drawings, FIG. 1 illustrates fragmentarily the front side of a combine harvester 10 including a main frame 11 supported on traction wheels 12, an operator's cab 13 supported from main frame 11, and a thresher housing 14 with a cut-crop receiving header 16, sometimes termed a cropgathering unit, attached to the front end of the thresher housing 14, and with the rear end of the thresher housing 14 being pivotally mounted on main frame 11 for movement about a transverse axis 17. Thresher housing 14 may enclose a rotatable thresher cylinder 19 having cylinder bars 20 which shell the grain from the straw and may also enclose a feeder beater 22 which feeds the cut-crop to the cylinder 19.

Header 16 is provided at its leading edge with a cutter bar assembly 23 which cuts the standing crop and may include a transversely extending reciprocable cutter bar 25 carrying a plurality of cutter blades 26 and also includes a plurality of spaced apart stationary sickle guards 27 which cooperate with the cutter blades 26 to cut the crop as cutter bar 25 reciprocates. Header 16 may support a rotatable auger 29 which moves the cut material to the center of the header.

The lowest point of header-to-ground clearance may be detected by a transversely extending, rotatable rock shaft, or cross shaft 33 having a plurality of ground-engaging, feeler bar fingers or drag links 34 integral with and spaced apart longitudinally of rock shaft 33 and which ride on the ground and follow the contour of the terrain. The cross shaft 33 may be rotatably supported in a plurality of bearing supports 35 affixed in spaced relation to cutter bar assembly 23 and rotates in proportion to the position of the drag links 35 which produce forces in a vertical plane only and indicate the lowest point of header-to-ground clearance. Rock shaft 33 together with feeler bar fingers 34 comprise a sensor follower assembly which causes rock shaft 33 to rotate if any of the fingers 34 encounters a rise in the contour of the terrain.

A hydraulic ram 36 is connected between the frame 11 and thresher housing 14 and is adapted to rotate thresher housing 14 about axis 17 when a raise solenoid RS (see FIG. 4d) is energized to direct pressurized fluid into the closed end of ram 36 and simultaneously exhaust fluid from the rod end to raise header 16, or when a lower solenoid LS is energized to direct pressurized fluid into the rod end of ram 36 and simultaneously exhaust fluid from the closed end of ram 36 to lower header 16.

The electrohydraulic system for ram 36 is schematically represented in FIG. 4d to include a pump P; a threeposition control valve CV; a conduit 37 connecting pump P and control valve CV and a conduit 38 connecting valve CV with the closed end of ram 36; a conduit 40 connecting valve CV and the rod end of ram 36; a conduit 41 connecting valve CV and a sump 42; raise solenoid RS adapted when energized to operate valve CV from a neutral position to a raise position wherein pressurized fluid from pump P and conduit 37 is directed through conduit 38 to the closed end of ram 36 to raise header 16 while fluid is simultaneously being exhausted from the rod end of ram 36 through conduits 40 and 41 into sump 42; and a lower solenoid LS adapted when operated to actuate valve CV to a lower position wherein pressurized fluid from pump P and conduit 37 is directed through conduit 40 to the rod end of ram 36 to lower header 16 while fluid is being simultaneously exhausted from the closed end of ram 36 through conduits 38 and 41 into sump 42.

The rotational position of rock shaft 33 may be coupled with a rotary analog position-sensing transducer C1 through a four-bar mechanism including a bell crank lever 45 affixed to and extending radially from one end of height-sensing rock shaft 33 and a link 50 pivotally connected at one end to lever 45 and at the other end to a radially extending rotatable arm 51 of transducer C1. The transducer C1 may be a rotary potentiometer or a rotary variable inductance but is shown as a sealed, rotary, variable capacitance mounted on an end wall 53 of header 16 and whose instantaneous capacitance is proportional to the instantaneous angular position of rock shaft 33.

Transducer C1 derives an analog electrical header height signal which is continuously proportional to the lowest point of header-to-ground clearance. Header height setpoint and deadband adjustments may be conveniently made in the cab 13 by the combine operator by modifying the header height analog electrical signal respectively in a height setpoint potentiometer HS and in a sensitivity-adjusting potentiometer DB which are positioned at the operator's platform and are preferably mounted on a console 54 within cab 13. A manual operator's switch RLS may be mounted on console 54 for selectively raising and lowering header 16 and for selectively initiating the standby mode or the automatic mode of the control logic as described hereinafter.

FIG. 3 is a schematic block diagram of the invention and represents that rotary transducer C1 is actuated by rock shaft 33 through mechanical linkage 45, 50 to sense the angular position of rock shaft 33 and derive a header height analog signal A which is proportional to minimum height of header 16 from the ground. The system forms a feedback control of rotational position of transducer C1 with respect to an operator-adjustable header height reference set on potentiometer HS which is accessible from the operator's platform. The measured header height signal A, which is a function of the angular position of rotary capacitor C1, is compared to a height setpoint signal B, derived by potentiometer HS, in a summer SUM which generates a height error signal whose value is at a null level when actual header height is equal to setpoint height and which varies in both magnitude and direction from the null level as a function of the variation between actual header height and setpoint height. The error signal is an input to an amplifier VGA whose gain is established by a sensitivity setting potentiometer DB at the operator's platform which is adjusted to achieve system stability by regulating the magnitude of amplifier output voltage C resulting from unit variation between actual header height and setpoint height. A deadband switch DBS converts error signal C into raise and lower command signals D and E respectively for operating raise and lower solenoids RS and LS in response to a predetermined departure of error signal C in opposite directions from the setpoint established by the operator on potentiometer HS. The raise and lower command signals D and E are transmitted through a logic circuit CL which interfaces with operator's manual switch RLS, prevents simultaneous operation of raise and lower solenoids RS and LS, provides safety functions, and also places the control in the automatic mode, wherein the command signals are transmitted to solenoids RS and LS, in response to actuation of a single switch, i.e., manual switch RLS, to the "lower" position and restores the control to the standby mode, in which the command signals are blocked from solenoids RS and LS and automatic operation is locked out, in response to actuation of switch RLS to the "raise" position.

Height Sensor

The height sensing circuit shown in FIG. 4a derives a DC header height voltage A which is an analog of, and inversely proportional to, the minimum clearance between header 16 and the ground. Inasmuch as radial arm 51 of rotary capacitance C1 is rotated in accordance with the angular position of rock shaft 33, the instantaneous capacitance of transducer C1 varies in proportion to minimum header-to-ground clearance.

NAND gates I1 and I2 are connected with a resistance R1 and a capacitance C2 in a relaxation oscillator, or astable multivibrator which provides a constant frequency and amplitude square wave output that is impressed across a capacitance voltage divider including a reference capacitance C3 in series with height sensing capacitance C1 to ground. Inasmuch as the impedance of transducer C1 varies inversely with frequency, the impedance of, and thus the AC voltage across, transducer C1 at point A' varies inversely with the angular position of rock shaft 33, and thus with header-to-ground clearance. The varying AC voltage at A' is transmitted through a coupling capacitor C4 to the input of an operational amplifier I3 having a feedback resistor R2 to establish the amplifier gain. The amplified AC signal is rectified in a half-wave diode rectifier D1, and the rectified signal is smoothed in a filter comprising a shunt condenser C5 and a bleed resistor R3 to derive unidirectional header height signal A whose magnitude is continuously proportional to, but an inversion of, the minimum header-to-ground clearance.

SUMMATION, GAIN AND DEADBAND CIRCUIT

The DC analog header height signal A appearing across R3 is applied to the summation, gain and deadband circuit shown in FIG. 4l which compares signal A with the operator-adjustable parameters of header height setpoint and sensitivity derived on potentiometers HS and DB respectively to generate raise and lower command signals D and E for the electrohydraulic power means including raise and lower solenoids RS and LS and ram 36 which raise and lower thresher housing 14. Header height signal A is coupled through an input resistance R5 to the inverting input of a summing operational amplifier SA. The combine operator adjusts setpoint selecting potentiometer HS, whose winding is connected between a positive voltage source B+ and ground, in accordance with desired height of header 16 above ground. The height setpoint reference signal B derived at the wiper of potentiometer HS is applied through a resistance R6 to the inverting input of amplifier SA. A reference voltage ref 1 is applied to the noninverting input of amplifier SA. Voltage ref 1 establishes the zero height-error level, or null level, of summing amplifier SA when actual header height is equal to the desired header height or setpoint height and the closed loop header height control is in the null condition. In the zero error (null) condition, output height error signal C from amplifier SA is equal to voltage ref 1 and the header height and setpoint signals A and B are such that no current flows in feedback potentiometer DB. In a preferred embodiment, signals A and B are equal in magnitude and opposite in polarity in the null condition so the sum of currents at the inverting input of amplifier SA is zero. Functionally signal B represents the inverse of header height setpoint with respect to reference voltage ref 1. In this way the summing of signals A and B actually represents the difference between actual header height and height setpoint. Inasmuch as operational amplifier SA sees the sum of signals A and B on its inverting input and inherently tends to maintain zero potential across its inputs, the height error output voltage C will be equal to voltage ref 1 and no current will flow in feedback potentiometer DB in the null condition when the difference between signals A and B is equal to the reference voltage ref 1 (e.g., when signals A and B are equal in magnitude and opposite in polarity in the preferred embodiment).

Figure 2:
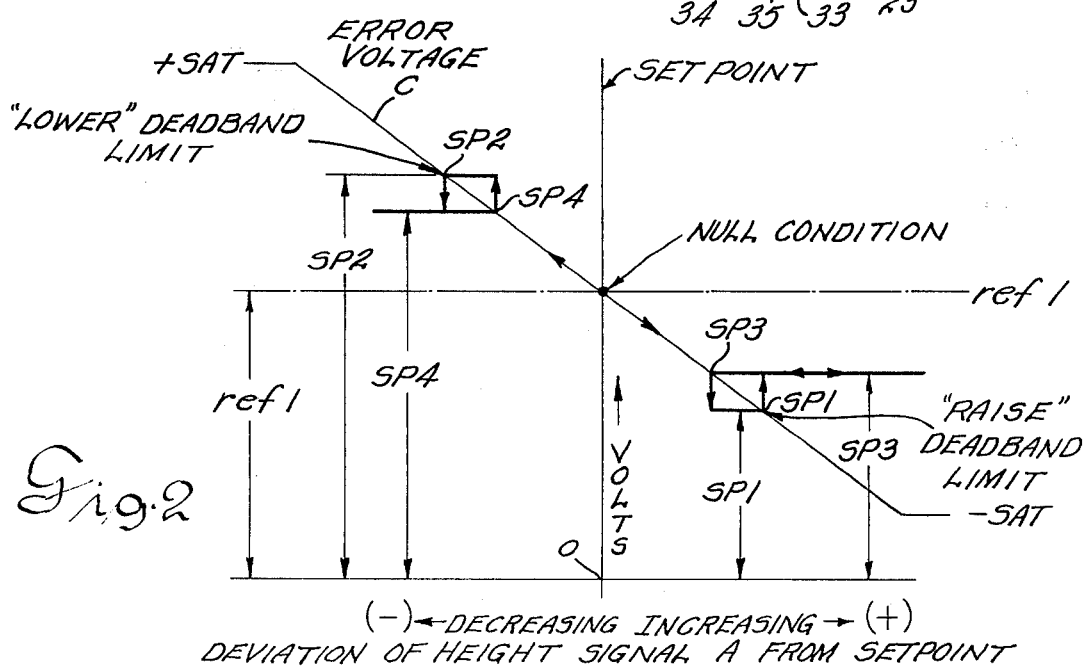
FIG. 2 is a diagrammatic representation of the deviation of the error signal from the null level to generate the command signals for the raise and lower solenoids and also of the variation of switching voltages for the Schmitt trigger comparators which establish fixed hysteresis between the operate and release points for the raise and lower solenoids.

Now if header height signal A increases relative to height setpoint signal B, the summation of currents flowing through resistances R5 and R6 increases, thereby causing the amplifier output height error voltage C to decrease and the resulting unbalance current to flow through feedback potentiometer DB. FIG. 2 represents such variation in summing amplifier output error voltage C with change in header height signal A, assuming a given height setpoint. It will be appreciated that unidirectional error signal C varies linearly in both direction and magnitude from the null condition, i.e., from reference voltage ref 1, as header height signal A deviates from the height setpoint signal B.

Deadband adjusting feedback potentiometer DB sets the amplification factor, or gain, of summing amplifier SA and thus defines the relative variation in output voltage C resulting from a unit change in either header height or in operator adjusted setpoint signal B.

The deadband circuit converts linearly varying error signal C into discrete raise and lower command signals D and E. Height error signal C is applied to the inverting input of a comparator operational amplifier I5 which normally is in the low state and is switched to the high state to derive raise command signal D. Error signal C is also applied to the inverting input of a comparator operational amplifier I6 which normally is in the high state and whose output is coupled to a NOT gate I7 which derives lower command signal E and whose output is normally logic 0. I6 is switched to the low state to provide logical 1 lower command signal from I7. Comparator operational amplifiers I5 and I6 operate as Schmitt trigger circuits which change state abruptly when the error signal input thereto crosses respective triggering levels, or switching points, SP1 and SP2 represented in FIGS. 2 and 5 and defined respectively by reference voltage source ref 2 in combination with resistor dividers R8, R9 and reference voltage source ref 3 in combination with resistor dividers R10, R11. Hysteresis is set for I5 by resistances R8 and R9, and hysteresis is set for I6 by resistances R10 and R11.

Comparator I5 establishes fixed hysteresis between the "operate" point and "release+ point for raise solenoid RS (see FIG. 5), and I6 similarly establishes fixed hysteresis between the "operate" point and the "release" point for lower solenoid LS. The change of switching points for I5 and I6 to accomplish such fixed hysteresis is illustrated in FIG. 2. At null condition, the closed loop system error voltage C is equal to ref 1 and is less than the voltage on the noninverting input of I6 as determined by the voltage divider resistances R10 and R11 together with ref 3, thereby causing the output of I6 to be high. This voltage determines switching point SP2 for I6. If the deviation of header height from the setpoint is beyond the lower deadband limit and error voltage C exceeds SP2, I6 will switch to the low state. I7 provides a signal inversion and generates the logical 1 lower command signal E. The positive feedback through R11 reduces the voltage on the noninverting input of I6 to switching point SP4 to thereby provide the desired hysteresis. The output of I6 will return to its normal high state when the closed loop system operates in response to the lower command signal E and lowers header 16 until error voltage C returns to a point below SP4.

At null condition error voltage C is greater than the voltage on the noninverting input of I5 as determined by the resistance R8 and R9 together with ref 2, and thus the output of I5 is low. This noninverting input voltage is represented by switching point SP1. Now, if header height becomes sufficiently lower than the setpoint so that error voltage C becomes less than SP1, I5 will switch to the high state to generate the raise command signal D. The feedback from the output of I5 through R9 raises the voltage on the noninverting input of I5 to switching point SP3. The output of I5 will return to its normal low state when the closed loop system operates in response to the raise command signal D and raises header 16 until error voltage C rises to a point above SP3.

FIG. 5 schematically illustrates deadband and represents deviations of error voltage C from voltage ref 1 as abscissae. The limits of the deadband in raise and lower directions are established by triggering levels SP1 and SP2 respectively. As long as error voltage does not fall below SP1 or rise above SP2, I5 remains low and I6 remains high so neither command signal D or E is being generated and solenoids RS and LS are disabled. When actual header height decreases sufficiently below setpoint height to cause error voltage C to fall below switching point SP1, I5 switches high to generate logical 1 raise signal D and operate raise solenoid RS. I5 remains high until the closed loop system raises header 16 sufficiently so that error voltage C rises above triggering level SP3, at which point I5 switches low to disable raise solenoid RS. Switching points SP1 and SP3 are fixed in magnitude, and consequently the hysteresis between the points SP1 and SP3 at which raise solenoid RS is operated and released is fixed and is independent of height setpoint adjustment and also independent of deadband adjustment. Similarly, I6 remains high as long as error voltage C is within the deadband limits, but when header height signal A becomes sufficiently greater than setpoint signal B so that error voltage C exceeds triggering level SP2, I6 goes low and causes I7 to generate logical 1 lower command signal E and thus energize lower solenoid LS. I6 remains low until the closed loop system lowers header 16 sufficiently until voltage C drops below switching point SP4.

Deadband adjusting potentiometer DB, which is accessible at the operator's platform, permits variation of gain of summing amplifier SA and thus establishes the "rate" at which error voltage C varies for a unit height error, i.e., a unit deviation of measured header height from height setpoint. When DB is set so gain of amplifier SA is relatively low, a given height error may not change error voltage C sufficiently so that it exceeds switching point SP1 or SP2 and neither command signal D or E is generated. However, if DB is set so gain of SA is relatively high, the same height error may change error voltage C sufficiently so that it exceeds one of the fixed switching points SP1 or SP2 (which establish the raise limit and the lower limit, respectively) and thus generates one of the command signals.

Control Logic

Control logic CL shown in FIG. 4c controls transmission of raise and lower command signals D and E to the raise solenoid RS and to the lower solenoid LS. Control logic CL provides for two operating modes, namely, automatic and standby. In the automatic mode, the raise and lower command signals are repeated at output terminals F1 and G1. In the standby mode, the command signals are not transmitted, and F1 and G1 remain at logical 0. It is only necessary for the operator to actuate a single switch RLS to select which mode the control is in. Operation of switch RLS to "lower" places the control in the automatic mode. This is desirable since the combine operator usually wants the header to go to setpoint height when he selects "lower" so that he can do some work. Operation of switch RLS to "raise" places the control in the standby mode and thereby locks out automatic operation. This is desirable since the operator usually selects "raise" at the end of the crop row when he wants the header to remain up.

The operating mode is established by the state of a latch formed by NAND gates I10 and I11. When the output of I11 is logical 1, the system is in the automatic mode. With a logical 0 output from I11, the system is in the standby mode. In the automatic mode, the logical 1 from I11 is coupled to NAND gates I8 and I9 to thereby allow a change of state of either command signal D or E to pass through gates I8 and I9 respectively. The outputs of I8 and I9 are inverted by NOT gates I24 and I21, respectively, to repeat the command signals on output terminals F1 and G1 to the solenoid drive circuits. In the standby mode, the logical 0 from I11 holds gates I8 and I9 at logical 1 output regardless of the state of command signals D and E, and the inversions by I24 and I21 hold the signals on output terminals F1 and G1 at logical 0.

The latch I10, I11 is set to "automatic" when gate I11 receives a logical 0 input from a NAND gate I15. The latch is set to "standby" when gate I10 receives a logical 0 input from a NOT gate I12. Under normal conditions both the input to I10 from I12 and the input to I11 from I15 are at logical 1, and the latch is in a state determined by the last one of such inputs to go to logical 0.

Gate I15 permits the operator to restore the control to the automatic mode at the beginning of each crop row by actuating switch RLS to "lower". I15 has its inputs coupled to the G2 lead and to the output of I9 which is at logical 1 when the lower command signal E is not being generated, i.e., $E=0$. Operation of switch RLS to "lower" applies logical 1 voltage to lead G2 so the output of I15 goes to logical 0 to set the latch to the automatic mode with logical 1 output from gate I11.

The control can be transferred to the standby mode by any one of three separate events. These events are summed in a logical OR circuit including NAND gate I14. Under normal conditions all three inputs to I14 are logical 1 so its output is logical 0 which is inverted by I12 to a logical 1 input to gate I10 of the latch. If any one of the three inputs to I14 goes to logical 0, the output of I12 also goes to logical 0 to reset the latch in the standby mode.

Upon initiation of power to the circuit, a capacitor C19 having one electrode coupled to an input of I14 is charged from a voltage source B+ through a resistance R19 to delay charging of C19 so that one input of I14 is at logical 0 to assure that the latch initially starts from the standby mode.

Another input of I14 is coupled to the output of a NAND gate I17 having its inputs respectively coupled to the output of I8 and the F2 lead. When the control is not deriving a raise command signal D, the output of I8 is logical 1, and operation of switch RLS to "raise" applies logical 1 to lead F2 to provide logical 0 from I17 and thus restore the latch to standby so that the command signals are not transmitted to RS and LS.

Control logic CL also provides short circuit protection by restoring the control to the standby mode in the event that either the raise solenoid RS or the lower solenoid LS is short circuited. The inputs to a NAND gate I19 are respectively coupled to the F1 lead and through an inverter I23 to the F2 lead. If the raise command signal D is being derived, F1 is at logical 1 and F2 should also be at logical 1 (see FIG. 4d) because it is connected through diode D2 and conducting transistor T3 to the positive power supply B+. However, if raise solenoid RS is shorted, lead F2 will be at ground or logical 0 thereby providing logical 1 from I23 and the logical 0 from I19. The logical 0 output of I19 is applied to one input of a NAND gate I18 whose logical 1 output is coupled through a resistance R13 and an inverter I16 to an input of I14. The logical 0 from I19 (when raise solenoid RS is shorted) provides logical 1 from I18 and logical 0 from I16 which is applied to an input to I14 to restore the latch to the standby mode.

Similar short circuit protection is provided for lower solenoid LS by logic gates I20, I22, I18, I16 and I14 but will not be described.

Solenoid Drive Circuit

The F1 and G1 leads from control logic CL, over which the raise and lower command signals D and E are transmitted, are coupled through resistances R27 and R28 respectively to the base of drive transistors T1 and T4 of the solenoid drive circuit shown in FIG. 4d. The drive circuits for the raise and lower solenoids RS and LS are identical and only the raise circuit will be described. The emitter of base drive transistor T1 is grounded and its collector is connected through a resistance R14 to a modified Darlington arrangement of transistors comprising a PNP transistor T2 having its base coupled to R14 and its collector connected to the base of a NPN transistor T3. One side of the operating coil of raise solenoid RS is grounded and the other side is connected to the F2 lead and also to the positive power supply B+ through the series arrangement of the emitter-collector gate of T3 and a diode D2. A resistance R15 is coupled between the collector and the base of transistor T2. Raise solenoid RS is energized when a logical 1 raise command signal D appears on lead F1 and forward biases the base of T1 to turn it on. Transistor T1 then saturates and draws current through R14 from the base of T2 and also through R15 in series with diode D2. Transistor T2 will then saturate and provide drive current to the base of T3 and current to the operating coil of raise solenoid RS. Transistor T3 conducts most of the current to the operating winding of solenoid RS and exhibits a voltage drop equal to the base-emitter drop $V_{BE}$ plus the saturation drop of transistor T2. Diode D2 protects against reverse current flow through the solenoid driver stage. A diode D4 connected in shunt to the operating coil of raise solenoid RS dissipates to ground any inductive energy that might damage the driver transistors T1, T2 and T3.

It will be appeciated that in alternative embodiments the deadband adjusting potentiometer DB for regulating the gain of summing amplifier SA can be omitted and the raise and lower bandwidth limits can be regulated by potentiometer means (not shown) accessible at the operator's platform for varying the magnitude of reference potentials ref 2 and ref 3 applied to the noninverting input of comparators I5 and I6. Further, it will also be appreciated that in alternative embodiments the header height signal and setpoint signal can be compared in one operational amplifier and the magnitude of the resulting error signal regulated in a separate deadband adjusting variable gain amplifier, in the manner shown in the block diagram of FIG. 3.

The embodiments of the invention in which an exclusive property or privilege is claimed are defined as follows:

1. A closed loop header height control for a crop harvester having a vertically adjustable cut crop receiving header comprising, in combination,
    position sensor means for deriving an electrical header height signal which continuously is an analog of the minimum clearance between said header and ground,
    setpoint adjusting means for deriving a selectively variable electrical setpoint signal indicative of desired height of said header,
    means for comparing said header height signal to said setpoint signal and for deriving a height error signal whose value is null when actual header height equals said desired height indicated by said setpoint signal and which deviates in magnitude and direction from said null as a function of the deviation between said actual header height and said desired height,
    deadband establishing means for deriving electrical raise and lower command signals in response to a predetermined deviation in the magnitude of said height error signal in opposite directions respectively from said null, and
    power means responsive to said raise and lower command signals respectively for raising and lowering said header.

2. A closed loop header height control in accordance with claim 1 wherein said comparing means derives a height error signal whose value is null when said header height signal is equal to said setpoint signal and varies from said null as a linear function of the algebraic difference between said header height signal and said setpoint signal.

3. A closed loop header height control in accordance with claim 2 wherein said deadband establishing means has fixed triggering levels on opposite sides of said null, said comparing means is variable in gain, and said control includes deadband adjusting means for selectively varying the gain of said comparing means.

4. A closed loop header height control in accordance with claim 3 wherein said comparing means includes an operational amplifier receiving said header height signal and said setpoint signal as inputs, and said deadband adjusting means includes means for selectively varying the gain of said operational amplifier.

5. A closed loop header height control in accordance with claim 4 wherein said crop harvester has an operator's platform and said setpoint adjusting means and said deadband adjusting means are accessible at said operator's platform.

6. A closed loop header height control in accordance with claim 1 wherein said comparing means includes an operational amplifier having said header height signal and said setpoint signal coupled to one input and a reference voltage coupled to another input and derives a height error output signal whose value is null and equal to said reference voltage when said header height signal is equal to said setpoint signal and deviates in both direction and magnitude from said reference voltage as a function of the algebraic difference between said header height signal and said setpoint signal.

7. A closed loop header height control in accordance with claim 6 wherein said deadband establishing means has fixed triggering levels on opposite sides of said reference voltage, and including deadband adjusting means for selectively varying the gain of said operational amplifier.

8. A closed loop header height control in accordance with claim 1 wherein said crop harvester has an operator's platform and said setpoint adjusting means and said deadband width adjusting means are accessible at said operator's platform.

9. A closed loop header height control in accordance with claim 1 wherein said position sensor means includes a sealed, rotary variable impedance transducer and means carried by said header and engaging the ground for rotating said transducer in accordance with said minimum clearance between said header and ground.

10. A closed loop header height control in accordance with claim 9 wherein said transducer is a variable capacitance, said position sensor means also includes an oscillator for applying a controlled waveform to said variable capacitance, and the magnitude of said header height signal is a function of the voltage drop across said variable capacitance.

11. A closed loop header height control in accordance with claim 10 wherein said position sensor means also includes a rotatable shaft mounted on said header and carrying a plurality of ground engaging members adapted to vary the angular position of said shaft in accordance with said minimum clearance, and a mechanical linkage between said shaft and said variable capacitance transducer for rotating said transducer to vary its impedance as a function of the angular position of said shaft.

12. A closed loop header height control in accordance with claim 1 wherein said deadband establishing means includes first and second Schmitt trigger circuits whose switching levels are respectively higher than and lower than said null value of said height error signal.

13. A closed loop header height control in accordance with claim 12 wherein each of said Schmitt trigger circuits has feedback means for varying its switching level in response to change of polarity of its output to thereby provide fixed hysteresis between generation and extinction of said command signals.

14. A closed loop header height control in accordance with claim 12 wherein said first and second Schmitt trigger circuits comprise first and second comparator operational amplifiers each receiving said height error signal on one input and having unidirectional voltages coupled to the other inputs to provide said switching levels which are respectively higher than and lower than said null value of said height error signal.

15. A closed loop header height control in accordance with claim 14 wherein said deadband establishing means has means including respective feedback resistances coupled between the output and said other input of said first and second comparator amplifiers for varying the switching voltages thereof when their respective output voltages change in polarity to thereby provide fixed hysteresis between generation and extinction of said command signals.

16. A closed loop header height control in accordance with claim 1 and including manual switch means operable between a raised position and a lower position in which said power means is respectively actuated to raise and to lower said header, and logic means switchable between automatic and standby conditions in which said command signals are respectively transmitted to and blocked from said power means, said logic means being switched to said automatic condition in response to operation of said manual switch means to said lower position.

17. A closed loop header height control in accordance with claim 16 wherein said crop harvester has an operator's platform, said setpoint adjusting means and said manual switch means are accessible at said operator's station, and said logic means is switched to standby condition in response to operation of said manual switch means to said raise position.

18. A closed loop header height control in accordance with claim 17 wherein said power means has raise and lower operating coils which are respectively energized by said raise and lower command signals, and said logic means is also switched to said standby condition in response to short circuiting of either of said operating coils.

19. A closed loop header height control for a crop harvester having a vertically adjustable header and an operator's platform comprising, in combination,
    position sensor means for deriving an electrical header height signal which continuously is an analog of the minimum clearance between said header and ground,
    setpoint adjusting means accessible at said operator's platform for deriving a selectively variable setpoint signal indicative of desired header height,
    means including a summing amplifier for comparing said header height signal to said setpoint signal and for deriving a height error signal at the output of said summing amplifier whose value is null when actual header height equals said desired height indicated by said setpoint signal and which deviates in magnitude and direction from said null in accordance with the variation between said header height and said desired height,
    means for deriving electrical raise and lower command signals in response to a predetermined deviation in the magnitude of said height error signal in opposite directions respectively from said null,
    deadband width adjusting accessible at said operator's platform for selectively varying the gain of said amplifier, and
    power means responsive to said raise and lower command signals respectively to raise and to lower said header.

20. A closed loop header height control in accordance with claim 19 wherein said setpoint adjusting means derives a setpoint signal which is, with respect to a reference voltage, an inverse function of the desired height of said header.

21. A closed loop header height control in accordance with claim 19 wherein said comparing means compares the sum of said header height and setpoint signals to a reference voltage and the value of said height error signal is null and equal to said reference voltage when said sum is equal to said reference voltage and deviates in both direction and magnitude from said reference voltage as a function of the variation between said sum and said reference voltage.

22. A closed loop header height control in accordance with claim 21 wherein said amplifier is a summing operational amplifier which receives said reference voltage on one input and said setpoint signal and said header height signal are coupled to the other input, and wherein said deadband width adjusting means comprises a feedback potentiometer for said summing amplifier.

23. A closed loop header height control in accordance with claim 19 wherein said position sensor means includes a sealed rotary variable impedance transducer, a rotatable shaft carrying a plurality of ground engaging members adapted to vary the angular position of said shaft in accordance with said minimum clearance, and a mechanical linkage between said shaft and said transducer for rotating said transducer to vary its impedance as a function of the angular position of said shaft.

24. A closed loop header height control in accordance with claim 23 wherein said transducer is a variable capacitance, and said position sensor means also includes oscillator means for applying a carrier to said variable capacitance so that the voltage drop thereacross is a function of header height.

25. A closed loop header height control in accordance with claim 19 wherein said means for deriving command signals includes first and second Schmitt trigger circuits whose switching levels are respectively higher than and lower than said null value of said height error signal.

26. A closed loop header height control in accordance with claim 25 wherein said first and second Schmitt trigger circuits include first and second comparator operational amplifiers each of which receive said height error signal on one input and which have unidirectional reference voltages coupled to their other input to form said switching levels which are respectively higher and lower than said null value.

27. A closed loop header height control in accordance with claim 26 wherein said means for deriving command signals also includes respective feedback means coupled between the output and said other input of each of said comparator amplifiers for varying the switching level thereof when its output voltage changes polarity to thereby provide fixes hysteresis between generation and extinction of said command signals.

28. A closed loop header height control in accordance with claim 19 wherein said power means has raise and lower operating coils which are respectively energized by said raise and by said lower command signals, and including manual switch means accessible at said operator's platform for applying raise and lower operating signals to said raise and lower operating coils respectively, and logic means switchable between automatic and standby conditions in which said command signals are respectively transmitted to and blocked from said operating coils and being switched to said automatic condition and to said standby condition respectively in response to said lower operating signal and to said raise operating signal.

29. A closed loop header height control for a crop harvester having a crop receiving header and an operator's platform comprising, in combination,
    means for deriving an electrical header height signal whose magnitude is an analog of the minimum clearance between said header and ground including a sealed rotary variable impedance transducer, a rotatable shaft mounted on said header and carrying a plurality of ground engaging members adapted to vary the angular position of said shaft in accordance with said minimum clearance, and means for rotating said transducer to vary its impedance as a function of the angular position of said shaft,
    height setpoint adjustment means accessible from said operator's platform for deriving an electrical setpoint signal which, with respect to a reference voltage, is an inverse function of the desired height of said header,
    means for comparing the sum of said header height signal and said setpoint signal to said reference voltage and for deriving a height error signal which is equal to said reference voltage when actual header height is equal to said desired header height indicated by said setpoint signal and deviates in both directions from said reference voltage as a function of the variation between said sum and said reference voltage,
    means for deriving electrical raise and lower command signals respectively in accordance with the deviation of said height error signal on opposite sides of said reference voltage and in response to a predetermined deviation of said height error signal from said reference voltage,
    deadband width adjusting means accessible at said operator's platform for selectively varying the magnitude of the deviation of said height error signal from said reference voltage resulting from a given variation of said sum from said reference voltage, and
    power means for raising and lowering said header in response to said raise and to said lower command signals respectively.

30. A closed loop header weight contol in accordance with claim 29 wherein said comparing means includes an amplifier which derives said height error signal on its output, and said deadband width adjusting means includes means for selectively varying the gain of said amplifier.

31. A closed loop header height control in accordance with claim 29 wherein said transducer is a variable capacitance and said header height signal deriving means includes an oscillator for coupling a controlled waveform to said variable capacitance.

32. A closed loop header height control in accordance with claim 30 wherein said amplifier is a summing operational amplifier having said header height and setpoint signals coupled to one input thereof and said reference voltage coupled to the other input.

33. A closed loop header height control in accordance with claim 32 wherein said deadband width adjusting means includes a feedback potentiometer for said summing amplifier.

34. A closed loop header height control in accordance with claim 29 and including manual switch means accessible at said operator's station for selectively deriving raise and lower electrical operating signals, said power means being responsive to said raise and lower operating signals to respectively raise and lower said header, and logic means switchable between automatic and standby modes in which it respectively transmits said command signals to and blocks them from said power means and being switchable to said automatic mode in response to the simultaneous presence of said lower operating signal and the absence of said lower command signal and to said standby mode in response to the simultaneous presence of said raise operating signal and the absence of said raise command signal.

35. A closed loop header height control in accordance with claim 29 wherein said command signal deriving means includes first and second comparator operational amplifiers each of which receive said height error signal on one input and which have switching points that respectively are greater than and less than said reference voltage.

36. A closed loop header height control in accordance with claim 35 wherein said command signal deriving means includes respective feedback means between the output and said other input of said first and of said second comparator amplifiers for varying the respective switching levels thereof when their output voltages change in polarity to thereby provide fixed hysteresis between generation and extinction of said command signals.

* * * * *